Figure 1:
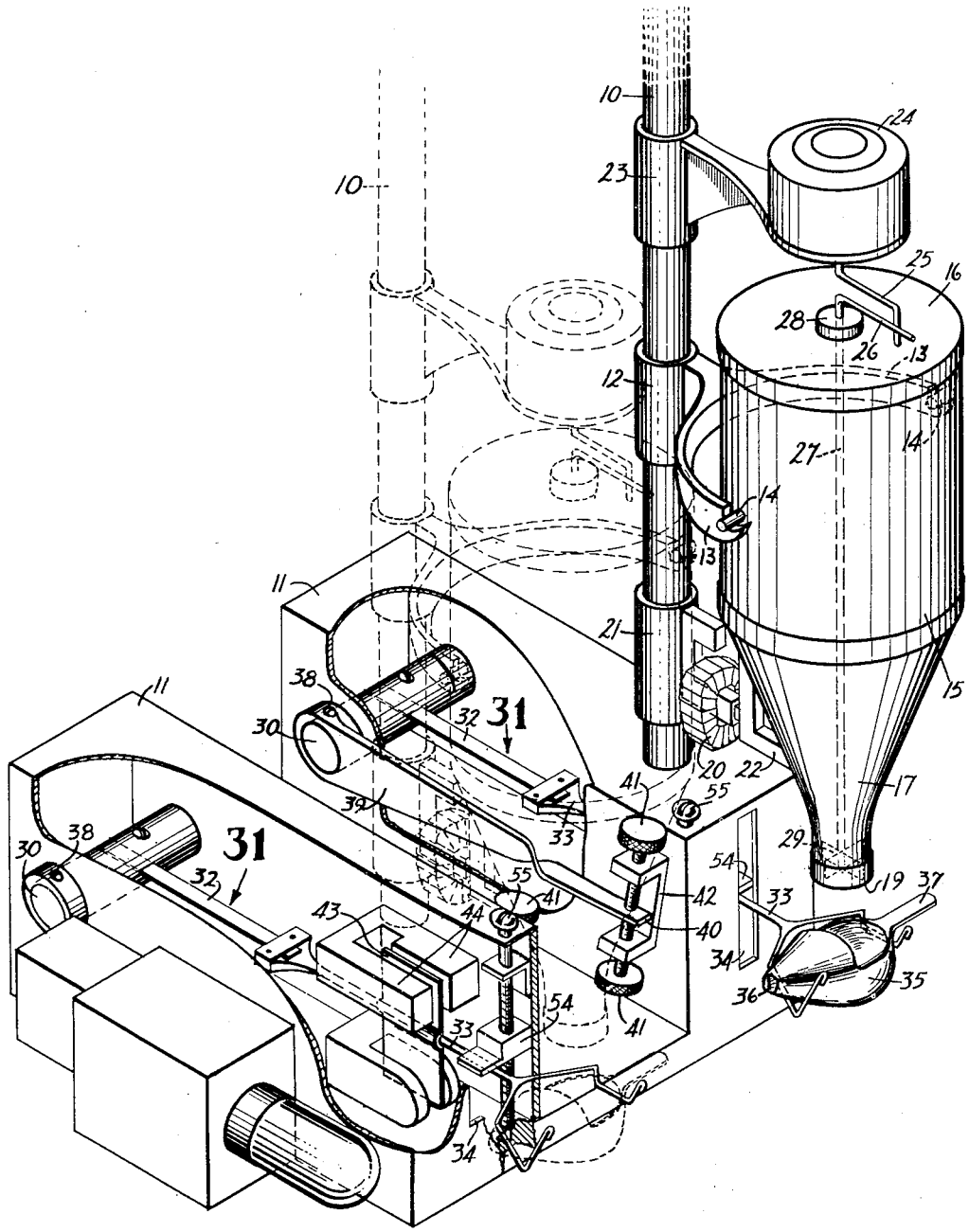

May 12, 1953

H. F. COFFEY 2,638,304

WEIGHING DEVICE

Filed March 22, 1949

2 Sheets-Sheet 1

INVENTOR.
HENRY F. COFFEY
BY
ATTORNEY.

May 12, 1953 H. F. COFFEY 2,638,304
WEIGHING DEVICE

Filed March 22, 1949 2 Sheets-Sheet 2

INVENTOR.
HENRY F. COFFEY
BY
ATTORNEY.

Patented May 12, 1953

2,638,304

UNITED STATES PATENT OFFICE 2,638,304

WEIGHING DEVICE

Henry F. Coffey, Indianapolis, Ind., assignor to Eli Lilly and Company, Indianapolis, Ind., a corporation of Indiana Application March 22, 1949, Serial No. 82,869

1 Claim. (Cl. 249—3)

This invention relates generally to weighing machines and more particularly to a machine of this character especially adapted to weigh relatively small quantities of powdery or pulverulent materials.

Therapeutic uses of penicillin and other powdered medicinals, particularly antibiotics, require that they be reduced to an extremely fine powder form. When agitated or vibrated as in weighing machines, these powdery substances are markedly affected by static charges which tend to cause their particles to form lumps or irregularly sized agglomerates. This tendency to "ball up" or cling together in clusters presents considerable difficulties in repetitively weighing relatively small dose amounts with precision. Such weighing operations, to be commercially satisfactory, demand not only a very high degree of accuracy to meet the stringent quantitative limits of the dose, but demand as well that the operations be carried out in rapid, repetitive succession with optimum dose uniformity and in mass production manner. Generally, heretofore, it has been necessary to weigh small doses of finely powdered medicinals by costly, time consuming laborious hand methods.

It is an object of the present invention to provide a relatively simple, compact, and inexpensive apparatus which permits of the facile and accurate weighing of small quantities of finely powdered materials in rapid, successive, weighing operations, and in such manner as to insure an extremely high degree of uniformity in weight between successive quantitative doses.

A further object of the invention is to eliminate the impeding effect of static charges on the speed and accuracy of weighing fine powders.

With these and incidental objects in view, the invention consists in certain novel features of construction and combinations of parts, the essential elements of which are set forth in appended claim and a preferred embodiment of which is hereinafter described with reference to the drawings.

Figure 2:
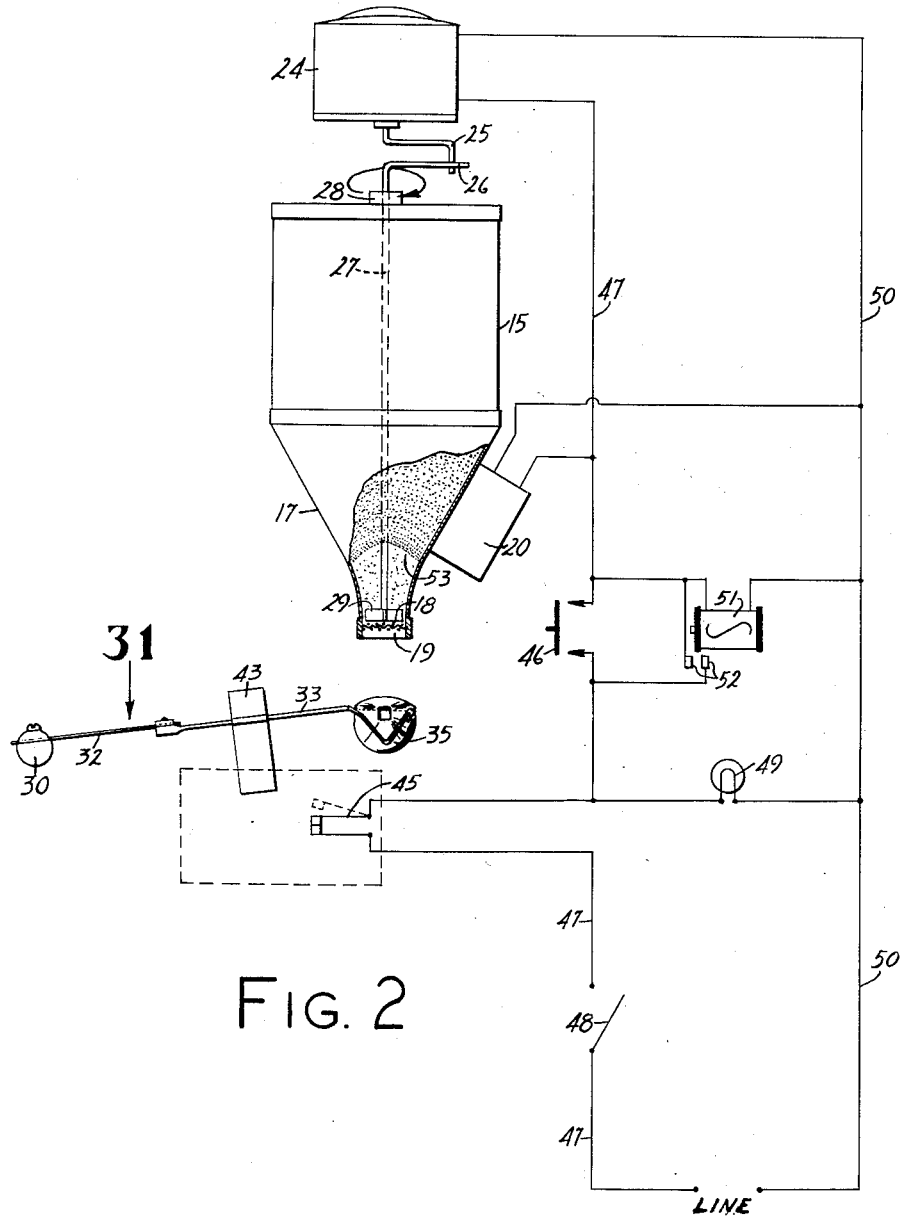

In the drawings:

Fig. 1 is a perspective view of the improved weighing apparatus with certain of the parts being shown in phantom and others being broken away for clearness, and Fig. 2 is a diagrammatic view of the apparatus and the electrical circuit therefor.

Referring now to Fig. 1, the apparatus comprises an upright supporting post 10 which may be secured at its lower end to the upper face of a casing 11 and rigidly affixed at its upper end in any suitable manner. A bracket 12 secured to post 10 has forwardly projecting arms 13 that are notched at their forward ends to receive outwardly extending diametrically opposed pins 14 secured on the outer wall of a material containing hopper 15 which is adapted to be loosely embraced by arms 13 when the pins 14 are mounted in the notches of the arms as shown in Fig. 1. Hopper 15 is provided at its upper end with a cover plate 16 and at its lower end has integrally connected therewith a depending funnel-shaped base portion 17. The extreme lower end of base portion 17 serves as a discharge end for the powdery material.

Referring now to Fig. 2, a fine mesh screen 18 of wire or other suitable material is mounted within a discharge orifice 19. The mesh of screen 18 is preferably such that its openings are of a size greater than the size of the discrete particles composing said powder, but are yet of such size that they normally are bridged by such particles due to the inherent tendency of the latter to cling together. A screen on the order of 16 mesh has been found satisfactory for weighing 420 mg. amounts of penicillin. An electrically operated vibrator 20 supported by a bracket 21 secured to post 10 has its vibrating element in engagement with the funnel-shaped portion 17 of hopper 15. A third bracket 23 affixed to post 10 above bracket 12 supports an electrically driven motor 24 in operative position above cover plate 16. The shaft of motor 24 has connected thereto a depend-crank 25 which is arranged to engage with a laterally projecting arm 26 of a vertically disposed shaft 27 which extends through a bearing 28 in cover plate 16. Shaft 27 extends vertically throughout the entire depth of hopper 15 and has secured at its lower end, horizontally disposed, radially projecting, wiper blades 29 the lower edges of which rest in slight wiping contact upon the surface of screen 18.

The weighing portion of the apparatus is substantially entirely enclosed within casing 11 and comprises a horizontally disposed shaft 30 suitably journaled at its opposite ends in the side walls of the casing. A spring beam generally indicated at 31 and comprising a spring section 32 of copper beryllium or other suitable flexible material and a beam section 33 of magnesium or other light material is affixed to shaft 30 as by securing one end of spring section 32 to the shaft as clearly shown in Figs. 1 and 2. The forward end of beam section 33 extends through a slot 34 provided in the forward end of casing 11. At that point where beam section 33 lies directly beneath orifice 19 of hopper 15, this section 33 is bifurcated and formed to removably receive a scoop 35 having a pour end 36 and a handle end 37. Scoop 35 is formed of aluminum or similar lightweight material.

Referring to Fig. 1, the inner end of shaft 30 has secured thereto as by means of a screw 38 an adjusting lever 39. The forward end 40 of adjustment lever 39 extends between two manually operable adjusting screws 41 threaded in a C-shaped bracket 42 affixed to the inner side of casing 11. A stop 54 suitably mounted upon a vertically disposed adjusting screw 55 is mounted for rotation in casing 11. By turning screw 55, stop 54 may be raised or lowered and serves to provide a limit stop to arrest the extent of upward movement of beam 31. By manipulating screws 41, lever 39 is moved upwardly or downwardly to rotate shaft 30 to adjust the tension of spring 32 of spring beam 31 to a degree such that the beam rests against stop 54 with proper tension.

It should be noted that the total mass of spring beam 31 and scoop 35 is distributed as uniformly as possible and does not exceed the minimum mass required to maintain the parts in proper functioning order. The amplitude of oscillation of the beam is, by the adjustment means just described, reduced to an over-all distance on the order of $\frac{1}{16}$ of one inch for weighing dose amounts on the order of 4 grams to 120 milligrams. These minima of mass and oscillation range make possible high speed and accuracy in successively repeated weighing operations.

Referring to Fig. 2, spring beam 31 has secured intermediate its ends, a depending vane 43 of aluminum or other suitable diamagnetic, light-weight material. Vane 43 constitutes one element of a conventional electro-mechanical control apparatus of standard and well known construction such as an "Electr-O-Vane" control, a product of the Brown Instrument Company. When spring beam 31 is in its normal upper, undeflected position, i. e., resting against stop 54, vane 43 will lie at an elevation where it is substantially above the space provided between two electrical field producing elements 44 (Fig. 1). When vane 43 is lowered a distance sufficient to materially intercept the electrical field produced by the elements 44, such interception causes a pair of normally closed contacts 45 (Fig. 2) contained in the "Electr-O-Vane" control to be opened. The adjustment of the spring tension of the beam by stop 54, lever 39 and screws 41 is preferably set so that a deflection of the beam on the order of $\frac{1}{16}$ of one inch will cause opening of the contacts 45.

Referring to Fig. 2, normally closed contacts 45 are wired in series with a normally open, push-button switch 46, and a manually-controlled, main switch 48 in one side, 47, of the line. From the manually-controlled switch 46, the side 47 of the line is connected to one terminal of vibrator 20 and to one terminal of motor 24. The opposite terminals of motor 24 and vibrator 20 are connected to the opposite side 50 of the line. A signal lamp 49 is connected across sides 47 and 50 of the line in such manner as to be only under the control of contacts 45 and main switch 48. However, vibrator 20 and motor 24 are connected in parallel for control by push-button switch 46, contacts 45 and main line switch 48. A holding relay 51 having a pair of normally open contacts 52 is connected, together with its contacts 52, across the sides 47 and 50 of the line in such manner as to bridge the contacts of push-button switch 46.

Operation

Assuming that hopper 15 has been filled with penicillin or other fine powdery medicament material, the operation of the apparatus is performed as follows:

The operator first closes the main line switch 48. This causes signal light 49 to be lighted. Switch 46 is then depressed to closed position. This causes energization of relay 51 whereupon holding contacts 52 are closed and hold closed the circuit initiated by the depression of push button switch 46.

Immediately upon the closing of switch 46, energization of relay 51 and closing of contacts 52, vibrator 20 is actuated and motor 24 is started to drive crank 25 in rotation. Vibrator 20 serves to vibrate and agitate the finely divided powdery substance downwardly to the funnel-shaped portion 17 of hopper 15. It is believed that the minute particles of powder become so compacted that at approximately the line indicated by the reference numeral 53 it forms a bridge leaving a relatively clear space or, at least, a space wherein the powder lies less densely compacted beneath this line. In any event a certain quantity of the powder is agitated downwardly in the vicinity of wiper blades 29 and screen 18. Since crank 25 is driven in rotation by motor 24 and since the crank is connected to rotate shaft 27, blades 29 will be driven in rotation to force powdery material through the screen and out through the discharge orifice 19.

By positively forcing the powder material out through fine wire mesh screen 18 any lumps or agglomerates are broken up and reduced into substantially their original particle form and thus the deleterious effect of static charges upon the particles are positively overcome. The powder passes through the relatively short air space between the discharge orifice 19 and the receiving orifice of scoop 35. As the powder descends into the scoop, spring beam 31 commences to deflect downwardly. As the powder continues to flow into the scoop the deflection gradually increases and continues until vane 43 is lowered into the field between elements 44 an extent sufficient to cause normally closed contacts 45 to open. Thereupon, relay 51 deenergizes and its contacts 52 restore to their normal open position. Concurrently, lamp 49, vibrator 20 and motor 24 are shut off, thus shutting off discharge of powder from hopper 15. This shut-off occurs substantially concurrently with the full quantity of the dose amount being received in the scoop 35, the amount of powder still in midair at the time of cut-off assisting in completing the predetermined amount of powder.

Following this, the operator dumps the scoop into a suitable medicament container and then replaces the scoop upon the beam in readiness to perform the next weighing operation, which is initiated by merely depressing push-button switch 46.

With such a precision apparatus as described in the foregoing and particularly in view of the stringent requirements that the dose limit of medicament be rigorously maintained, it is desirable that the weighing operation be checked occasionally. This checking operation may readily be performed on the present apparatus in the following manner:

With main line switch 48 in closed position and push-button switch 46 in open position so that no powder will be delivered from hopper 15 and with an empty scoop 35 positioned on beam 31, the lighting of signal light 49 will signal the operator that the apparatus is in readiness for the checking operation. Assuming that a dose of 420 mg. is to be weighed, a 410 mg. weight is placed in the scoop. If the signal lamp remains lighted, this indicates that 410 mg. is insufficient to terminate powder discharge and no adjustment is made at this time. On the other hand, if the signal lamp is extinguished by the placement of the 410 mg. weight in the scoop, the apparatus is adjusted by raising vane 43 by means of lever 39 and screws 41, until the lamp is lighted. The 410 mg. weight is then removed and a weight of 420 mg. is substituted therefor. If the signal lamp 49 is extinguished, no adjustment is necessary as this indicates that when the dose limit of 420 mg. is reached in actual weighing operations, the powder discharge will be cut off. However, if the lamp remains lighted, the apparatus is adjusted by the means above described to lower vane 43 to such a position that the lamp is extinguished. Following this, the 410 mg. weight is replaced in the scoop and if the lamp remains lighted, this indicates that the apparatus is in proper condition to weigh out a dosage amount of 420 mg. of material. That is to say, that the apparatus is now adjusted to between 410 mg. and 420 mg. or, i. e., about 415 mg. The 5 mg. difference compensates for the inertia of the deflecting parts and the amount of powder which is in midair at the exact time of cut off by vane 43.

Fig. 1 shows two units such as have been described in the foregoing. The units are arranged side by side and it has been found in practice that an operator can, with efficiency and facility, carry on repeated weighing operations with this dual unit arrangement. While a previously weighed scoop 35 is being discharged into a medicament receptacle, the scoop 35 of the second unit is being filled and by the time the operator has emptied the scoop 35 of the first unit, the scoop 35 of the second unit will have received the full dose amount.

While the form of apparatus herein shown and described is admirably adapted to fulfill the objects primarily stated it is to be understood that it is not intended to confine the invention to one form of embodiment herein disclosed for it is susceptible of embodiment in various forms all coming within the scope of the claim which follows:

What is claimed is:

In a machine for automatically, successively, and repetitively weighing predetermined small dose amounts of finely powdered medicinals; said machine including a supply hopper for said medicinal having a discharge orifice; means for discharging said medicinal from said orifice and means for arresting said discharge when the weight quantity of said predetermined dose amount has been discharged therefrom, the combination of a weighing beam of small mass comprised of a flat spring section fixed at one of its ends to one end of a light, rigid section; a scoop; means formed on the opposite end of said rigid section for removably supporting said scoop, the opposite end of said spring section being fixed to an adjustable beam support member mounted below and at such distance to one side of said discharge orifice as to cause the beam-supported scoop to lie in spaced relation beneath and in substantial vertical alignment with said discharge orifice for movement in an arcutae path; a stop member adjacent the scoop-supporting end of said rigid section adjustable to arrest the latter against upward movement in said path; means associated with said adjustable beam support to flex said spring section an amount sufficient to preload said beam substantially to the equivalent of the weight of said predetermined small dose amount whereby the arcuate movement of said beam about said support is reduced to a minimum compatible with effecting actuation of said means for arresting discharge of said medicinal, and repetitive dose amount weighing operations are materially expedited; said adjustable beam support member comprising a rotatably mounted shaft; and said means for flexing said spring section comprising a lever affixed at one end to said shaft and opposed adjusting screws cooperatively associated with the opposite end of said lever to impart adjusting movement thereto and lock said lever in adjusted position.

HENRY F. COFFEY.

References Cited in the file of this patent

UNITED STATES PATENTS

| Number | Name | Date |
|---|---|---|
| 66,524 | Shaler | July 9, 1867 |
| 679,968 | Inman | Aug. 6, 1901 |
| 1,233,124 | Powers | July 10, 1917 |
| 1,345,866 | Lorenson | July 6, 1920 |
| 1,364,003 | Smith | Dec. 28, 1920 |
| 1,466,835 | Jennings | Sept. 4, 1923 |
| 1,660,109 | Ward | Feb. 21, 1928 |
| 2,071,443 | Weckerly | Feb. 23, 1937 |
| 2,095,283 | Peale | Oct. 12, 1937 |
| 2,132,237 | Haegele | Oct. 4, 1938 |
| 2,367,247 | Valerino | Jan. 16, 1945 |
| 2,381,086 | Steele | Aug. 7, 1945 |
| 2,387,894 | Fannin | Oct. 30, 1945 |
| 2,566,210 | Kendall | Aug. 28, 1951 |

FOREIGN PATENTS

| Number | Country | Date |
|---|---|---|
| 604,201 | Great Britain | June 30, 1948 |